United States Patent
Kobayashi et al.

(10) Patent No.: US 6,304,920 B1
(45) Date of Patent: Oct. 16, 2001

(54) SWITCHING MEANS FOR DIRECTLY CONTROLLING OPERATION OF DATA STORAGE DEVICES, DATA STORAGE/REPRODUCING DEVICES, AND DATA REPRODUCING DEVICES

(75) Inventors: Kazuo Kobayashi; Hiromu Koyauchi; Sinji Tsuyuki, all of Kanagawa (JP)

(73) Assignee: Mitsumi Electric Co., Ltd., Kanagawa (JP)

( * ) Notice: Subject to any disclaimer, the term of this patent is extended or adjusted under 35 U.S.C. 154(b) by 0 days.

(21) Appl. No.: 09/537,595

(22) Filed: Mar. 28, 2000

Related U.S. Application Data

(62) Division of application No. 09/002,945, filed on Jan. 5, 1998, now Pat. No. 6,078,966.

(30) Foreign Application Priority Data

Jan. 14, 1997 (JP) .................................................... 9-004809
Jan. 14, 1997 (JP) .................................................... 9-004810

(51) Int. Cl.[7] ................................ G06F 13/00; G06F 3/00; H04L 12/40
(52) U.S. Cl. ................................ 710/1; 710/131; 711/111
(58) Field of Search .................................. 710/1, 33, 131, 710/107; 709/219, 231; 711/4, 100, 111; 714/2; 712/29; 370/351; 340/825.89

(56) References Cited

U.S. PATENT DOCUMENTS

| | | | |
|---|---|---|---|
| 5,638,509 | * | 6/1997 | Dunphy et al. . |
| 5,781,407 | * | 7/1998 | Brauel . |
| 5,892,502 | * | 4/1999 | Hiller . |
| 5,907,717 | * | 5/1999 | Ellis . |
| 6,064,658 | * | 5/2000 | Jenkin . |
| 6,129,449 | * | 10/2000 | McCain et al. . |

* cited by examiner

Primary Examiner—Gopal C. Ray
(74) Attorney, Agent, or Firm—Fattibene & Fattibene; Paul A. Fattibene; Arthur T. Fattibene

(57) ABSTRACT

A storage device for directly fetching external data and for relaying the transfer of data, wherein a CD-R drive unit 13 is provided, as a data input device, with a computer input/output terminal 35, a card reader unit 18 for reading the data of a PC card 20, an infrared ray communication port 16, and a modular jack 17. When switches 26 and 28 are horizontally connected in the drawing, the data fetched by data input devices other than the computer input/output terminal 35 are written into a CD-R 32 and are stored. When a switch 34 is flipped to the left tilted direction in the drawing, the data written into the CD-R 32 are read out and output to the body 12 of a desk-top personal computer.

13 Claims, 8 Drawing Sheets

SWITCHING MEANS FOR DIRECTLY CONTROLLING OPERATION OF DATA STORAGE DEVICES, DATA STORAGE/REPRODUCING DEVICES, AND DATA REPRODUCING DEVICES

The present application is a divisional of prior application Ser. No. 09/002,945, filed Jan. 5, 1998, U.S. Pat. No. 6,078,966.

BACKGROUND OF THE INVENTION

1. Field of the Invention

The present invention relates to a storage device, a storage/reproducing device, and a rewritable reproducing device that are incorporated in or attached to a personal computer as a unitary structure. More particularly, the invention relates to a storage device, a storage/reproducing device, and a reproducing device that are incorporated in or attached to a desk-top personal computer as a unitary structure.

2. Background of the Invention

The storage device of this kind has heretofore not been equipped with an external data input means, and data have been always input through a personal computer such as a personal computer one. Without a personal computer, therefore, the storage device is unable to operate. However, with the widespread use of various information equipment such as PHS, digital camera and the like, which have a prerequisite of transferring the data to a personal computer, it would be more convenient if transfer of data can be relayed by a storage device.

Therefore, there arises a technical problem to be solved that storage devices of this kind must be provided with a function of directly fetching the data from an external unit and relaying the transfer of data. The object of the present invention is to solve this problem.

So far, furthermore, conventional storage/reproducing devices and the reproducing devices of this type have usually been formed in the shape of a thin box. Therefore, a storage/reproducing device of built-in type has a narrow area exposed from the front of the desk-top personal computer, and is difficult to secure a space where the connector for fetching record data from an external data unit is installed. It may be possible to lead out the connector cable from the back of the personal computer and lay the cable along the outer side of the personal computer. However, this causes the operation to be complex, marring the appearance. It would be convenient if the storage/reproducing device and the read-only reproducing device of the attached type, too, have a function of easily fetching data from an external data unit.

Therefore, there arises a technical problem to be solved that storage/reproducing devices and the reproducing devices of this kind are improved to easily fetch external data. The object of the present invention is to solve this problem.

SUMMARY OF THE INVENTION

The present invention has been proposed in order to achieve the above-mentioned objects, and provides a storage device comprising a computer input/output unit, and other input units such as a space wave communication port, a PC card loading/reading unit, and a telephone circuit connection unit, and further including a first switching means for connecting either an input circuit from the computer input/output unit or an input circuit from the other input units to a recording circuit connected to a storage unit of optical, magnetic, or magneto-optical type, a second switching means for connecting the input circuit from the other input units to either the recording circuit connected to the storage unit or an output circuit connected to the computer input/output unit, and a third switching means for connecting either a reproducing circuit from the storage unit or the input circuit from the other input units to the output circuit connected to the computer input/output unit.

The invention further provides a storage/reproducing device accommodated in a storing portion formed in a recessed manner in the front of a personal computer, or a storage/reproducing device externally attached to a personal computer, wherein a space wave communication port is disposed in the front or on the top, the data fetched by the space wave communication port are recorded on a storage means of optical, magnetic, or magneto-optical type, and the recorded data are read out and output to the personal computer.

The invention further provides a reproducing device accommodated in a storing portion formed in a recessed manner in the front of a personal computer, or a reproducing device externally attached to a personal computer, wherein a space wave communication port is disposed in the front or on the top of the device, so that the data fetched by the space wave communication port, too, are output to the personal computer, in addition to a reproducing device that reads data stored in a storage means of optical, magnetic or magneto-optical type and outputs the data to the personal computer.

DETAILED DESCRIPTION OF THE PREFERRED EMBODIMENTS

Figure 1:
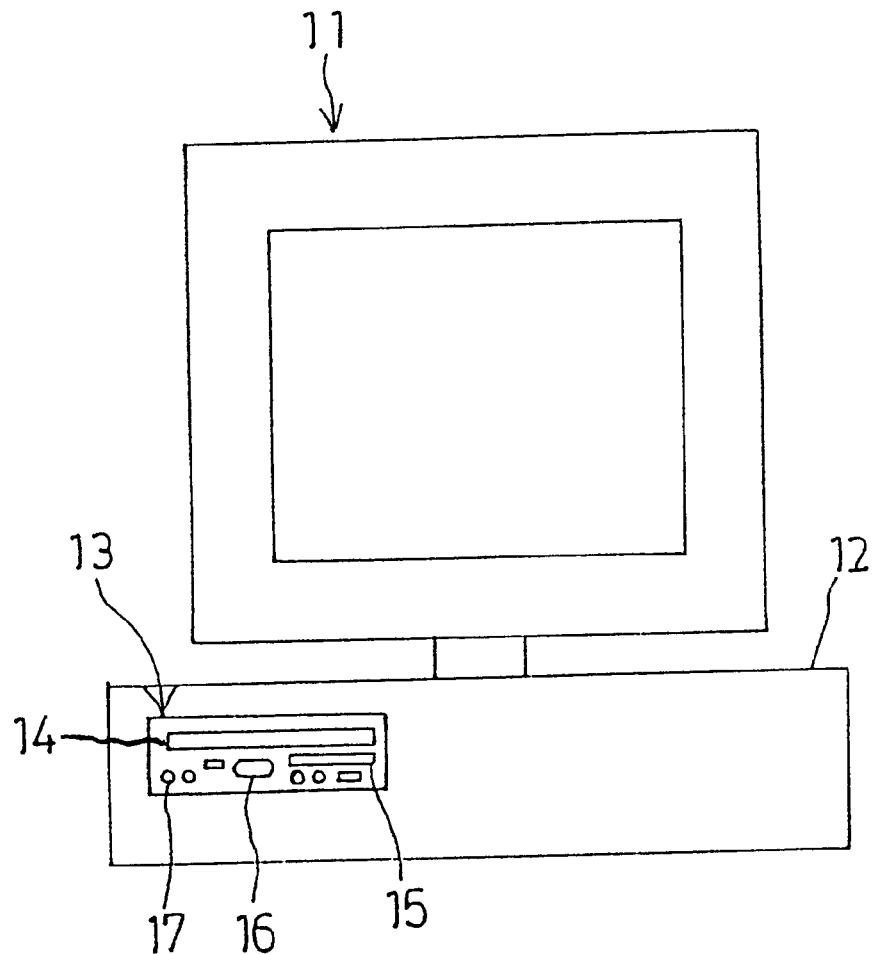
FIG. 1 is a front view of a desk-top personal computer illustrating an embodiment of the present invention.

An embodiment of the invention will now be described below in detail with reference to FIGS. 1 to 2. In FIG. 1, reference numeral 11 denotes a desk-top personal computer system. A body 12 of the desk-top personal computer 11, having a video monitor 10 connected thereto, incorporates a CD-R drive unit 13 which is an example of a storage unit according to the present invention.

The CD-R drive unit 13 is formed in the shape of a thin box, and its front face is exposed from the front of the main body 12. In the exposed front face are disposed a CD-R slot 14, a PC card slot 15, an infrared communication port 16 of IrDA standard, and a modular jack 17 for connection to a telephone circuit.

Figure 2:
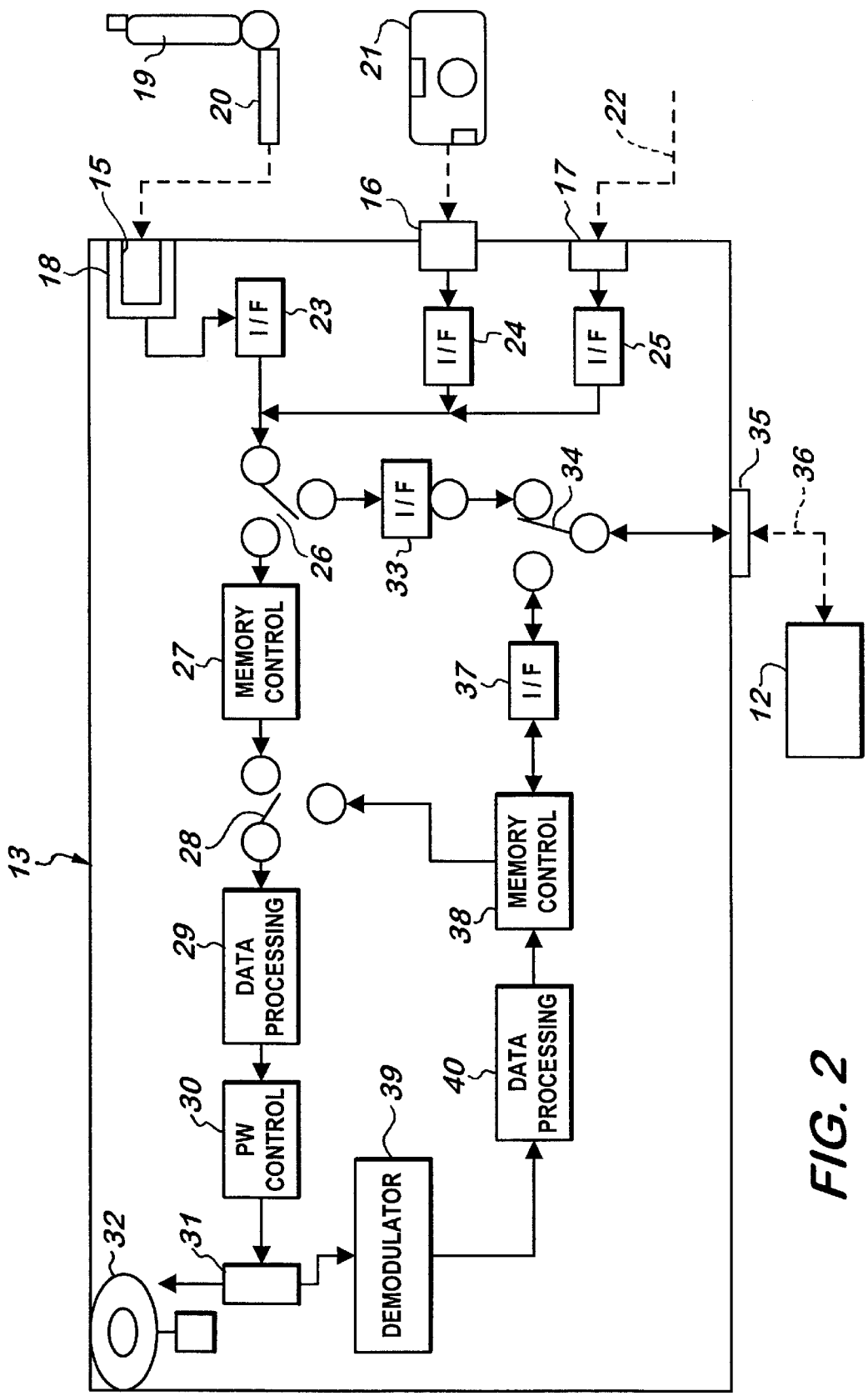
FIG. 2 is a block diagram of FIG. 1.

As shown in FIG. 2, the PC card slot 15 is formed integrally with a card reader unit 18. Upon inserting a PC card 20 such as PHS 19 or the like in the PC card slot 15, the card reader unit 18 reads the data recorded on the PC card 20. Owing to a detent mechanism or the like mechanism, the PC card 20 can be detachably inserted in the PC card slot 15.

Furthermore, the infrared communication port 16 receives data transmitted from a digital camera 21 having an infrared communication function of the IrDA standards placed in front of the CD-R drive unit 13. Thus, image data taken by using the digital camera 21 are transferred to the CD-R drive unit 13.

By connecting a telephone circuit 22 to the modular jack 17, furthermore, various data sources are accessible through the telephone circuit 22 and can be fetched by the CD-R drive unit 13.

Various data fetched by the CD-R drive unit 13 from the card reader unit 18, infrared communication port 16 and modular jack 17, are subjected to intermediate processings through I/F units 23, 24, 25, and arrive at a switch 26. When the switch 26 is flipped to the horizontal direction in the drawing, the data are once buffered by a memory control unit 27. When a switch 28 at the succeeding stage of the memory control unit 27 (left side in the drawing) is flipped to the horizontal direction in the drawing, the data pass through the switch 28 and are subjected to parity checking through a data processing unit 29.

After the electric power for recording is controlled by a PW control unit 30, the data are written into a CD-R 32 loaded in the CD-R slot 14 by an optical head 31. Thus, the data from the PC card 20, digital camera 21 or telephone circuit 22 are directly fetched by the CD-R drive unit, and are recorded and stored without passing through the desk-top personal computer 11.

When the switch 26 is flipped to a lower tilted direction in the drawing, the data that have passed through the I/F units 23, 24, 25 are converted through an I/F unit 33 into an interface format of the SCSI standard or the ATAPI standard. When a switch 34 located at the succeeding stage of the I/F unit 33 (lower side in the drawing) is flipped toward the right tilted direction in the drawing, the data arrive at a computer input/output terminal 35 through the switch 34, and are output to the body 12 of the desk-top personal computer 11 through a connecting cable 36. Thus, the CD-R drive unit 13 in this case serves as an input means enabling the desk-top personal computer 11 to fetch external data. Therefore, even when the desk-top personal computer 11 is not provided with means for inputting external data, external data can be easily fetched through the CD-R drive unit 13, enabling the desk-top personal computer 11 to have an improved function.

When the data in the body 12 of the desk-top personal computer 11 are output to the CD-R drive unit 13 after flipping the switch 28 toward the lower tilted direction in the drawing and flipping the switch 34 toward the left tilted direction in the drawing, then, the data pass through the switch 34 and are subjected to an intermediate processing at the I/F unit 37, buffered by a memory control unit 38, and sent to the switch 28. The data then pass through the switch 28, data processing unit 29 and PW control unit 30, and are written onto the CD-R 32 by the optical head 31. Thus, the CD-R drive unit 13 in this case serves as an auxiliary storage unit for the desk-top personal computer 11. Therefore, when the capacity of the hard disk in the desk-top personal computer 11 is insufficient, the CD-R drive unit 13 can be used in its place.

When the data written on the CD-R 32 are read out by the optical head 31 after flipping the switch 34 toward the left tilted direction in the drawing, the data are demodulated by a demodulator unit 39, and then subjected to a processing such as a processing of removing the parity code in a data processing unit 40. The data are then fetched by the body 12 of the desk-top personal computer 11 passing through the memory control unit 38 and the I/F unit 37. Thus, the data written on the CD-R 32 are reproduced on the monitor of the desk-top personal computer 11, making it possible to edit the data.

Here, use is made of a CD-R as a storage unit. The present invention, however, is in no way limited thereto, and a magnetic disk such as a floppy disk or a magneto-optical disk such as a mini-disk may be used. Moreover, the invention of claims 1 to 4 can be modified in a variety of ways without departing from the spirit of the invention, and includes all such modifications as a matter of course.

For the storage device of the invention as described above, external data can be directly fetched through "other input units" without passing through a personal computer. It is further possible to output fetched external data directly to the personal computer, or to fetch data from the personal computer and record it by using three kinds of "switching means". It is therefore possible to add an input function to a personal computer which is not provided with an input unit that corresponds to the above-mentioned "other input units". Also, the storage device can be used as a so-called auxiliary storage device of the personal computer, contributing to enhancing the utility of the personal computer and of various information equipment.

The storage device according to the invention fetches external data by space wave communication. The space wave communication port, which is an input unit requires an installation space smaller than that of the connector, and does not mar the system's appearance. Such a configuration is very effective when the storage device is incorporated as a unit in the desk-top personal computer.

The storage device according to the invention accommodates the PC card, receives the data, and records and regenerates the data. Therefore, the user is allowed to directly input the data from, the example, the PHS, or to input data into the PC card by using PDA or the like remotely and easily transfer the data from the PC card to the storage device.

For the storage device according to the invention, various data sources are accessible through a telephone circuit, and data can be recorded and reproduced.

Embodiments of the inventions will now be described in detail with reference to FIGS. 3 to 8. For simple description, common elements in the embodiments of the claims of FIGS. 3 to 8 are denoted by the same reference numerals.

Figure 3:
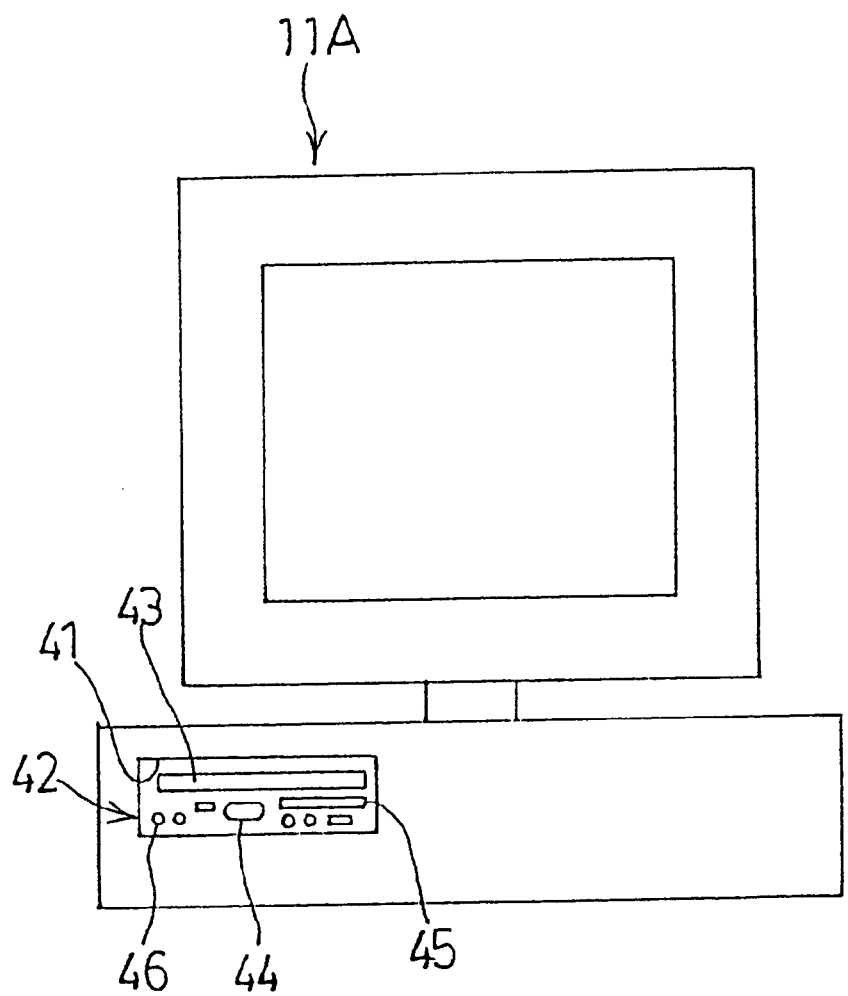
FIG. 3 is a front view illustrating a second embodiment of the invention.

Referring to FIG. 3, reference numeral 11A denotes a desk-top personal computer system. A storing portion 41 of the shape of a thin box is formed in a recessed manner in the front of a desk-top personal computer 11A, and a CD-R drive unit 42 which is a storage/reproducing device of the invention of claim 3 is accommodated in the storing portion 41. Therefore, the front of the CD-R drive unit 42 is exposed from the storing portion 41. The CD-R drive unit 42 is provided in the exposed front and an infrared communication port 44 conforming to the IrDA standards is disposed therein. Moreover, a PC card slot 45 and a modular jack 46 for connection to a telephone circuit are arranged.

Figure 4:
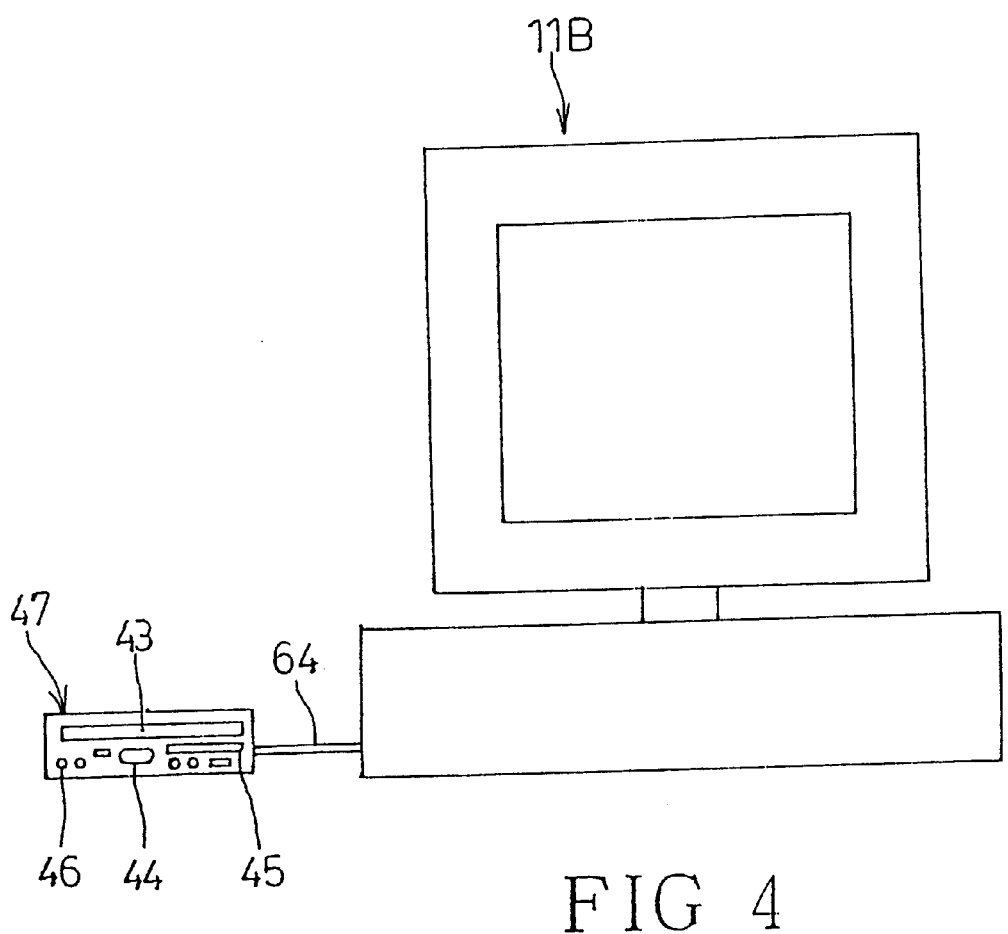
FIG. 4 is a front view illustrating a third embodiment of the invention.

A CD-R drive unit 47 which is a storage/reproducing device of the invention is attached to a desk-top personal computer 11B shown in FIG. 4. A CD-R slot 43 is opened in the front of the CD-R drive unit 47, and an infrared communication port 44 of the IrDA standards, a PC card slot 45 and a modular jack 46 for connection to a telephone circuit are also provided.

Figure 5:
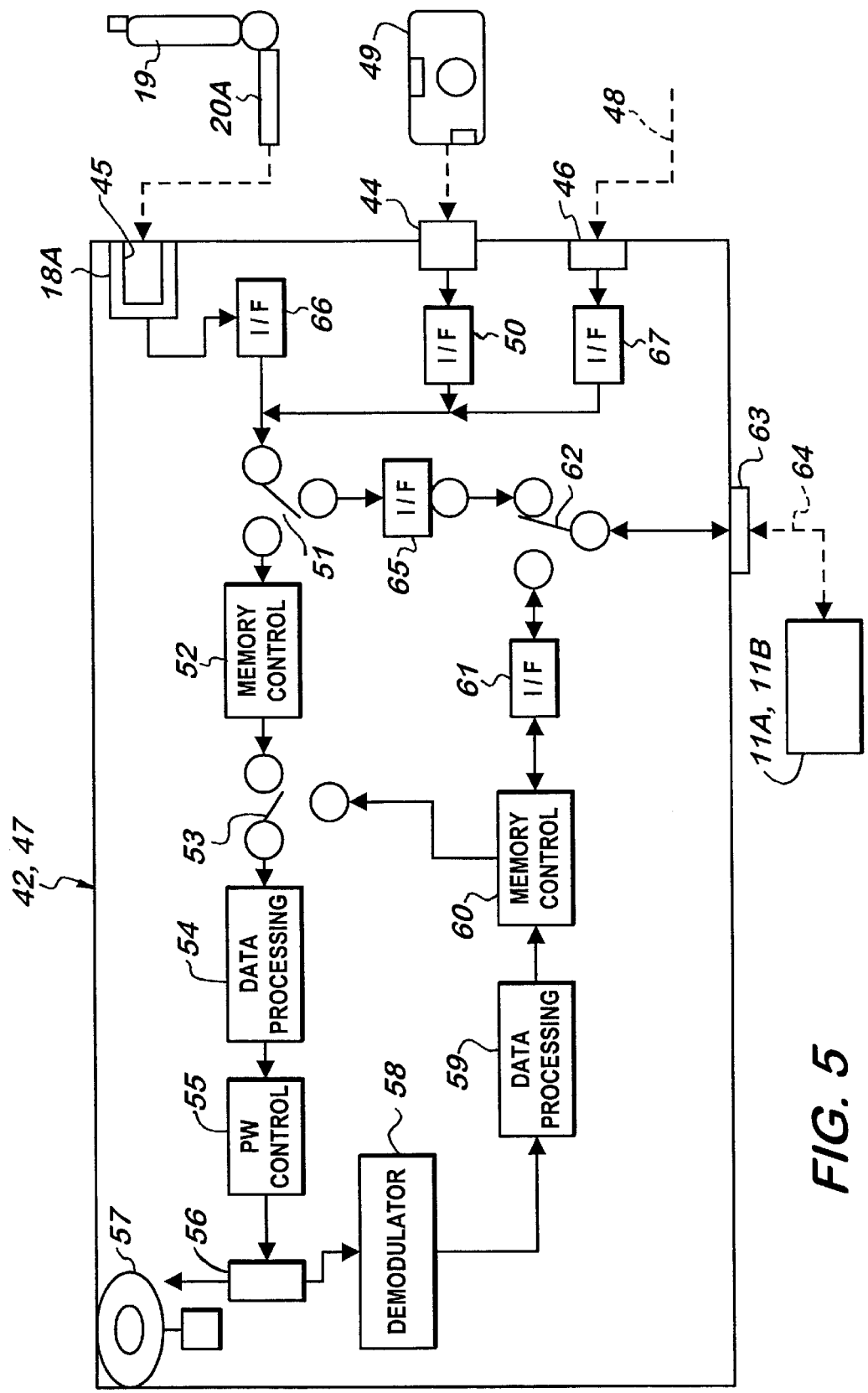
FIG. 5 is a block diagram of FIGS. 3 and 4.

As shown in FIG. 5, the PC card slot 45 is formed integrally with a card reader unit 18A. When a PC card 20A of a PHS 19 is inserted in the PC card slot 45, the card reader unit 18A reads the data through the PC card 20A. Owing to a detent mechanism, the PC card 20A can be detachably inserted in the PC card slot 45. Upon connecting a telephone circuit 48 to the modular jack 46, furthermore, a variety of data sources can be accessed via the telephone circuit 48, and data can be fetched by the CD-R drive units 42, 47.

The infrared communication port 44 receives data transmitted from a digital camera 49 having an infrared communication function conforming to the IrDA standards placed in front of the CD-R drive unit 42, 47. Thus, the data on the image taken by the digital camera 49 are very easily transferred to the CD-R drive unit 42, 47. Moreover, the infrared communication port 44 requires an installation space smaller than that of the connector, and is easy to install and does not mar the system's appearance.

The image data fetched by the CD-R drive unit 42, 47 are subjected to an intermediate processing through an I/F unit 50, and are sent to a switch 51. After flipping the switch 51 toward the horizontal direction in the drawing, the image data are once buffered by the memory control unit 52. Then, flipping a switch 53 at the succeeding stage of the memory control unit 52 (left side in the drawing), the image data are sent to a data processing unit 54 through the switch 53 and subjected to parity checking. Then, the electric power for recording is controlled by the PW control unit 55, and the data are written by an optical head 56 into a CD-R 57 stored in the CD-R slot 43, and stored.

To reproduce image data recorded and stored in the CD-R 57, the image data are read out by the optical head 56. The image data that are read out are demodulated by a demodulator unit 58 and are subjected to a. processing such as a processing of removing the parity code in a data processing unit 59. After buffering by the memory control unit 60, the data are converted into an interface format of the SCSI standards or the ATAPI standard through an I/F unit 61, and sent to a switch 62. When the switch 62 is flipped toward the left tilted direction in the drawing, the image data are output to the desk-top personal computer 11A, 11B through a computer input/output terminal 63 and a cable 64. Thus, the image data are reproduced and displayed on the monitor 10 of the desk-top personal computer 11A, 11B, making it possible to edit and print out the image data.

When the switch 51 is flipped toward the lower tilted direction in the drawing, the image data that have passed through the I/F unit 50 are converted into the interface format of the above-mentioned predetermined standards through an I/F unit 65. When the switch 62 is flipped toward the right tilted direction in the drawing, the image data are output to the desk-top personal computer 11A, 11B through the computer input/output terminal 63 and the cable 64. Thus, the CD-R drive unit 42, 47 in this case serves as an input means enabling the desk-top personal computer 11A, 11B to receive the image data, and helps improve the performance of the desk-top personal computer which has not been provided with a space wave communication function such as an infrared receiving system.

The data fetched by the CD-R drive unit 42, 47 from the card reader unit 18A and the modular jack 46 are subjected to an intermediate processing through I/F units 66, 67, and sent to the switch 51. When the switches 51 and 53 are flipped toward the horizontal direction in the drawing, data are written into the CD-R 57 by the optical head 56 through the memory control unit 52, data processing unit 54 and PW control unit 55, and are recorded and stored like the above-mentioned image data. The same holds for reproduction. When the switch 62 is flipped toward the left tilted direction in the drawing, the data are output to the desk-top personal computer 11A, 11B through the optical head 56, demodulator unit 58, data processing unit 59, memory control unit 60, I/F unit 61, computer input/output terminal 63 and cable 64.

When the switch 51 is flipped toward the lower tilted direction in the drawing and the switch 62 is flipped toward the right tilted direction in the drawing, the data fetched by the CD-R drive unit 42, 47 from the card reader unit 18A and modular jack 46 are output to the desk-top personal computer 11A, 11B through the I/F unit 66 or 67, I/F unit 65, computer input/output terminal 63 and cable 64 like the above-mentioned mentioned image e data. In this case, the CD-R drive unit 42, 47 serves as an input means enabling the desk-top personal computer 1A, 11B to fetch data recorded in the PC card 20A and data accessed through the telephone circuit 48.

Next, after the switch 53 is flipped to the lower tilted direction in the drawing, and the switch 62 is flipped toward the left tilted direction in the drawing, data in the desk-top personal computer 11A, 11B are output to the CD-R drive unit 42, 47 from the desk-top personal computer 11A, 11B through the cable 64. Then, the data are written into the CD-R 57 by the optical head 56 through the I/F unit 61, memory control unit 60, data processing unit 54 and PW control unit 55. In this case, the CD-R drive unit 42, 47 serves as an auxiliary storage device for the desk-top personal computer 11A, 11B.

Figure 6:
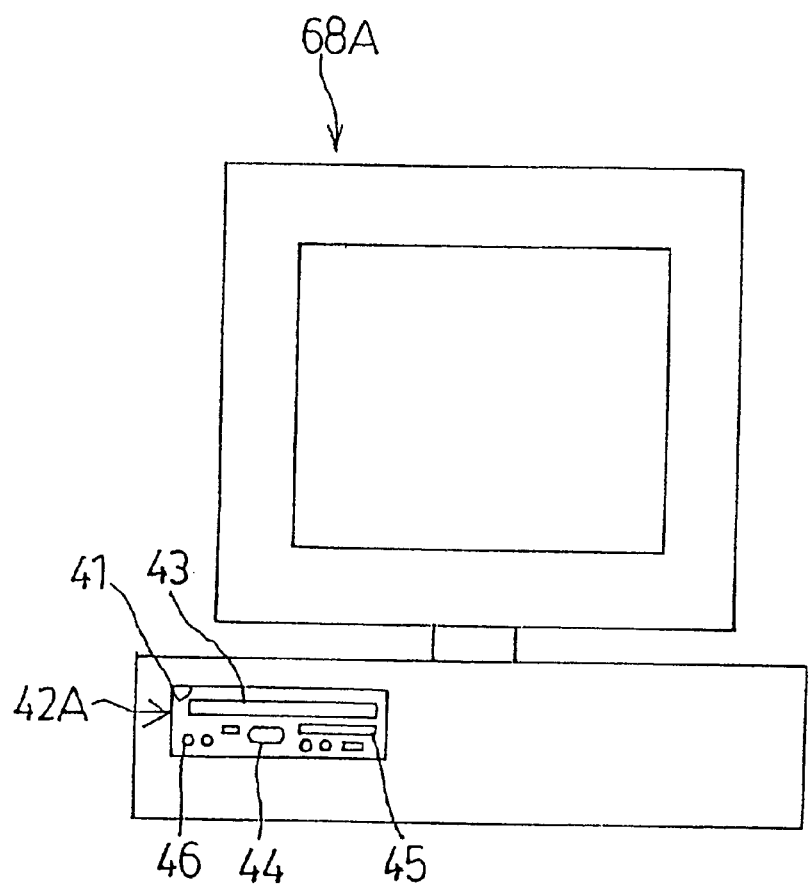
FIG. 6 is a front view illustrating a fourth embodiment of the invention.

In a desk-top personal computer 68A shown in FIG. 6, a storing portion 41 is formed in a recessed manner in the front thereof, and a CD-ROM drive unit 42A which is a reproducing device according to the invention is accommodated in the storing portion 41. In the front of the CD-ROM drive unit 42A, a CD-ROM slot 43 is formed and an infrared communication port 44 of the IrDA standards is disposed. There are further disposed a PC card slot 45, a modular jack 46 for connection to a telephone circuit, and the like.

Figure 7:
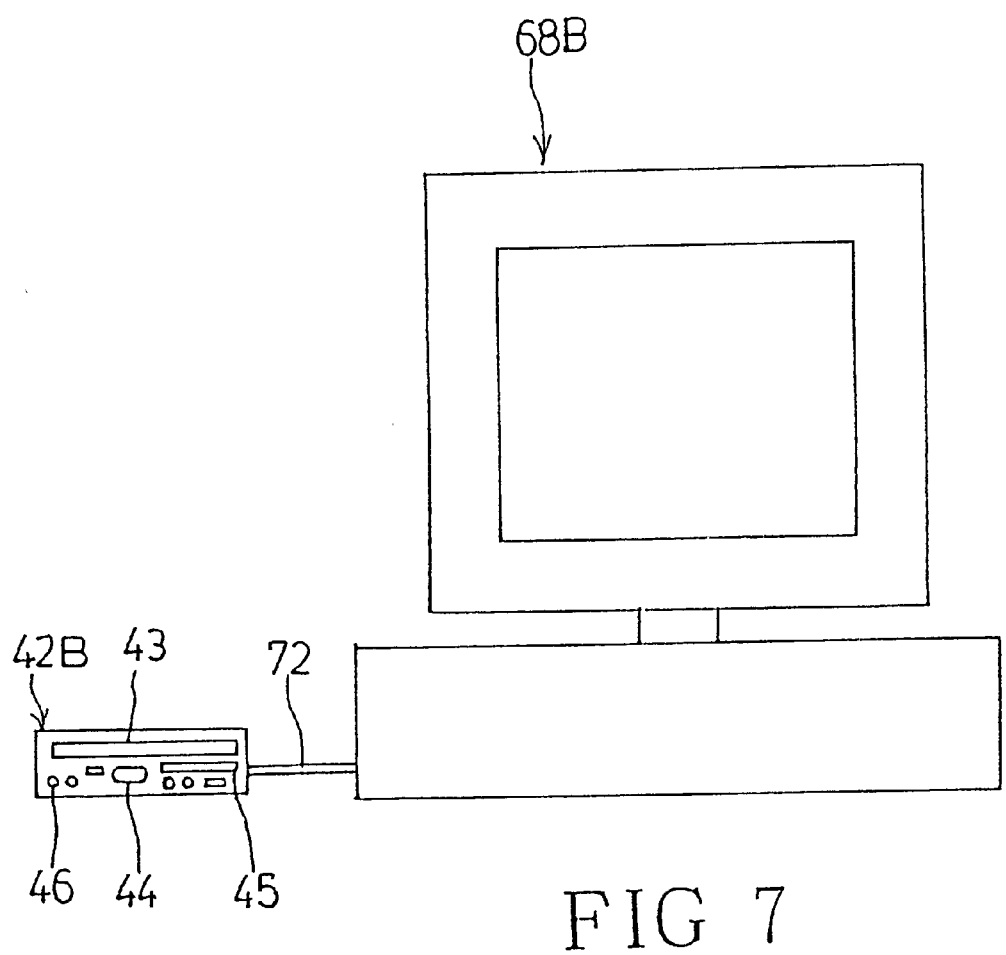
FIG. 7 is a front view illustrating a fifth embodiment of the invention.

As shown in FIG. 7, a CD-ROM drive unit 42B which is a reproducing device of the invention is attached to a desk-top personal computer 68B. In the front of the CD-ROM drive unit 42B, the CD-ROM slot 43 is formed, the infrared communication port 44 of the IrDA standard is disposed and, the PC card slot 45, modular jack 46 for connection to a telephone circuit, and the like, are also disposed.

Figure 8:
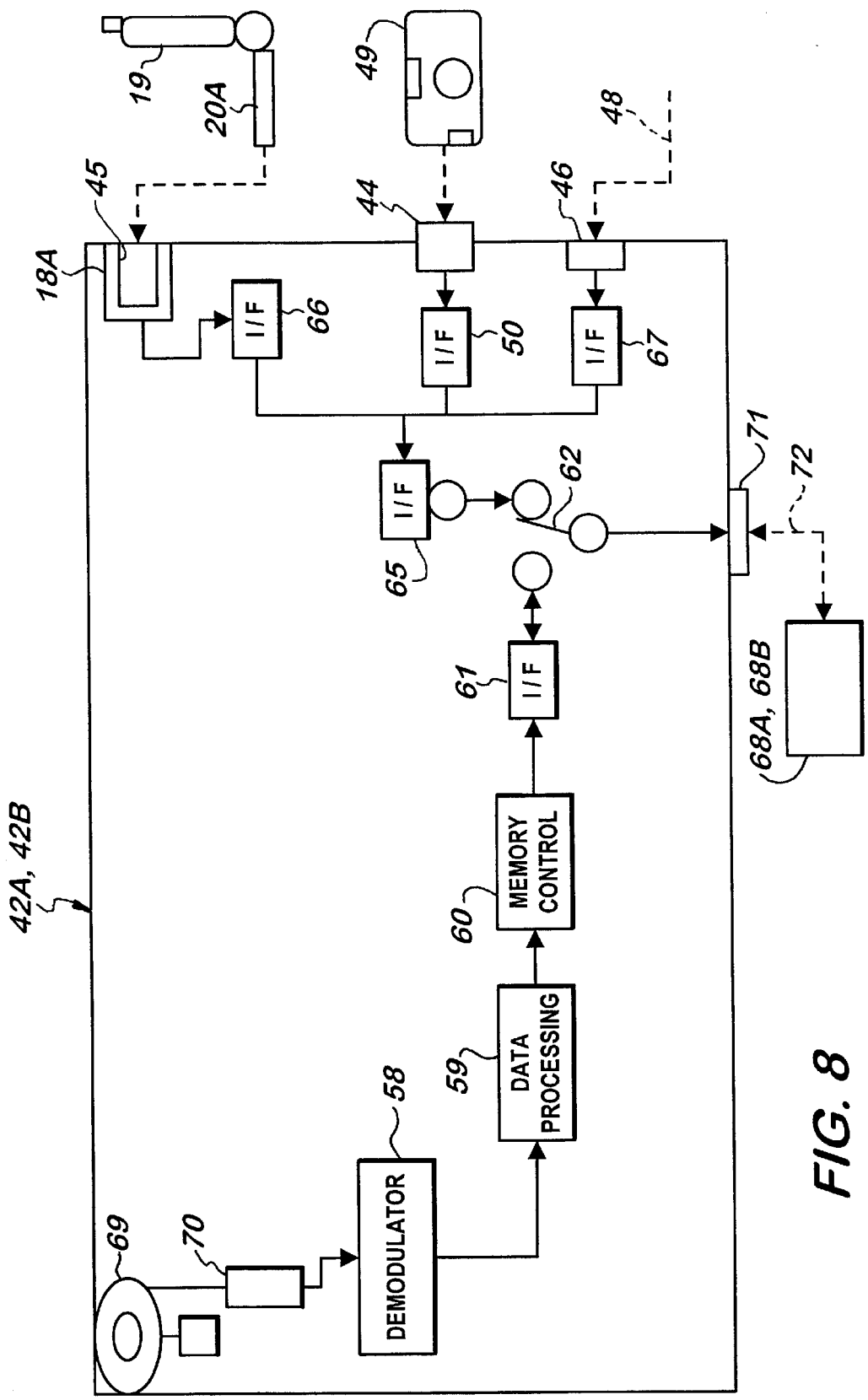
FIG. 8 is a block diagram of FIGS. 6 and 7.

As shown in FIG. 8, the CD-ROM drive unit 42A, 42B has a structure from which are removed constituent elements related to the writing function (concretely, switch 51, memory control unit 52, switch 53, data processing unit 54, and PW control unit 55) of the CD-R drive unit 42, 47. Normally, the switch 62 is flipped toward the left in the drawing, the data recorded in the CD-ROM 69 stored in the CD-ROM slot 43 are read out by a read-only optical disk 70, and the data that are read out are output to the desk-top personal computer 68A, 68B through the demodulator unit 58, data processing unit 59, memory control unit 60, I/F unit 61, computer output terminal 71, and cable 72, and reproduced.

When the switch 62 is flipped toward the right tilted direction in the drawing, image data of a digital camera 49 are fetched by the infrared communication port 44, and output to the desk-top personal computer 68A, 68B through the I/F unit 50, IF unit 65, computer output terminal 71 and cable 72. Thus, the image data can be edited by using the desk-top personal computer 68A, 68B and can be printed out. The CD-ROM drive unit 42A, 42B in this case serves as an input means enabling the desk-top personal computer 68A, 68B to fetch image data from the digital camera 49, and helps improve the function of the desk-top personal computer which has not been furnished with an infrared space wave communication function.

Similarly, the data fetched through the PC card 20A and the data accessed through the telephone circuit 48, can be fetched by the CD-ROM drive unit 42A, 42B through the card reader unit 18A formed integrally with the PC card slot 45 and the modular jack 46, and can be output to the desk-top personal computer 68A, 68B through the I/F unit 66 or 67, I/F unit 65, computer output terminal 71 and cable 72.

Here, image data of the digital camera 49 having an infrared communication function are transmitted to the infrared communication port 44 which is a space wave communication port. The present invention, however, is in no way limited thereto only and can be applied to any data transmitted from information apparatus having a space wave communication function such as of infrared rays. Similarly, furthermore, the CD-R 57 and CD-ROM 69 are used as storage means. The invention, however, is in no way limited thereto only, and there can be used a magnetic disk such as a floppy disk or a magneto-optical disk such as a mini-disk. Moreover, the inventions can be modified in a variety of ways without department from the spirit of the invention, and cover all such modified embodiments as a matter of course.

As described above, the storage/reproducing device and the reproducing device of the present invention make it possible to easily and directly fetch data from information apparatus without any cable, as long as the information apparatus of the data transmitting side is provided with a space wave communication function, and, further, make it possible to record and reproduce data or to output data directly to a personal computer. The space wave communication port for fetching data requires an installation space smaller than that required by the connector, and can be easily disposed though the storage device has a small thickness without marring the appearance. Moreover, no limitation is imposed on the personal computer body such as a desk-top personal computer or the like contributing to improving the performance of the personal computer which is not furnished with a space wave communication function.

What is claimed is:

1. A storage/reproducing device accommodated in a storing portion formed in a recessed manner in a front of a personal computer, wherein a space wave communication port is disposed in the front, data fetched by said space wave communication port are recorded into an optical, magnetic, or magneto-optical storage unit, and the recorded data are read out and output to said personal computer.

2. A storage/reproducing device externally attached to a personal computer, wherein a space wave communication port is disposed on a surface, data fetched by said space wave communication port are recorded into an optical, magnetic, or magneto-optical storage unit, and the recorded data are read out and output to said personal computer.

3. A reproducing device accommodated in a storing portion formed in a recessed manner in a front of a personal computer and used for reading out data recorded in an optical, magnetic or magneto-optical storage unit and for outputting the data to said personal computer, wherein a space wave communication port is disposed in the front, so that the data fetched by said space wave communication port, too, are output to the personal computer.

4. A reproducing device externally attached to a personal computer and used for reading out data recorded in an optical, magnetic or magneto-optical storage unit and for outputting the data to said personal computer, wherein a space wave communication port is disposed on a surface, so that the data fetched by said space wave communication port, too, are output to the personal computer.

5. A storage and data transfer device for use with a personal computer comprising:
   a space wave communication port;
   a storage unit; and
   a switch connected to said space wave communication port, said storage unit, and the personal computer wherein said space wave communication port, said storage unit, and the personal computer are selectively coupled together,
   whereby data fetched by said space wave communication port is capable of being directed to either said storage unit or the personal computer.

6. A storage and data transfer device as in claim 5 wherein:
   said storage unit comprises an optical storage unit.

7. A storage and data transfer device as in claim 5 wherein:
   said storage unit comprises a magnetic storage unit.

8. A storage and data transfer device as in claim 5 wherein:
   said storage unit comprises a magneto-optical storage unit.

9. A storage and data transfer device as in claim 5 wherein:
   said storage unit is internally contained within the personal computer.

10. A storage and data transfer device as in claim 5 wherein:
    said storage unit is externally connected to the personal computer.

11. A storage and data transfer device for use with a personal computer used to transfer data from an external source comprising:
    a space wave communication port;
    a storage unit;
    means for reading from said storage unit; and
    means for selectively coupling to said space wave communication port, said storage unit, and the personal computer,
    whereby data fetched by said space wave communication port is capable of being directed to either said storage unit or the personal computer.

12. A storage and data transfer device as in claim 11 further comprising:
    means for recording to said storage unit.

13. A storage and data transfer device for use with a personal computer used to transfer data from an external source to the personal computer comprising:
    a space wave communication port for receiving data from the external source;
    a storage unit selectively coupled directly to said space wave communication port;
    means, coupled to said storage unit, for writing to said storage unit with the data received from the external source by said space wave communication port;
    means, coupled to said storage unit, for reading from said storage unit the data written to said storage unit; and
    means for selectively coupling to said space wave communication port, said storage unit, and the personal computer wherein the data fetched by said space wave communication port is capable of being directed to either said storage unit or the personal computer.

* * * * *